(12) United States Patent
Sadowsky

(10) Patent No.: US 6,981,252 B1
(45) Date of Patent: Dec. 27, 2005

(54) METHOD AND APPARATUS FOR AUTOMATICALLY UNINSTALLING SOFTWARE ON A NETWORK

(75) Inventor: Richard Sadowsky, San Jose, CA (US)

(73) Assignee: Symantec Corporation, Cupertino, CA (US)

( * ) Notice: Subject to any disclaimer, the term of this patent is extended or adjusted under 35 U.S.C. 154(b) by 807 days.

(21) Appl. No.: 09/834,703

(22) Filed: Apr. 12, 2001

Related U.S. Application Data

(60) Provisional application No. 60/218,310, filed on Jul. 14, 2000.

(51) Int. Cl.[7] ............................................. G06F 9/45
(52) U.S. Cl. .................................................... 717/176
(58) Field of Search ............................... 717/176, 178, 717/173

(56) References Cited

U.S. PATENT DOCUMENTS

| | | |
|---|---|---|
| 3,969,723 A | 7/1976 | Kennicott |
| 4,558,413 A | 12/1985 | Schmidt et al. |
| 4,714,992 A | 12/1987 | Gladney et al. |
| 4,809,170 A | 2/1989 | Leblang et al. |
| 4,962,532 A | 10/1990 | Kasiraj et al. |
| 5,155,847 A | 10/1992 | Kirouac et al. |
| 5,182,806 A | 1/1993 | McKeeman et al. |
| 5,204,960 A | 4/1993 | Smith et al. |
| 5,377,354 A | 12/1994 | Scannell et al. |
| 5,479,654 A | 12/1995 | Squibb |
| 5,495,610 A | 2/1996 | Shing et al. |
| 5,508,817 A | 4/1996 | Kunigami |
| 5,519,866 A | 5/1996 | Lawrence et al. |
| 5,555,346 A | 9/1996 | Gross et al. |
| 5,557,723 A | 9/1996 | Holt et al. |
| 5,566,335 A | 10/1996 | Nash et al. |
| 5,574,906 A | 11/1996 | Morris |
| 5,581,764 A | 12/1996 | Fitzgerald et al. |
| 5,613,108 A | 3/1997 | Morikawa |
| 5,619,648 A | 4/1997 | Canale et al. |
| 5,649,200 A | 7/1997 | Leblang et al. |
| 5,671,398 A | 9/1997 | Neubauer |
| 5,673,387 A | 9/1997 | Chen et al. |
| 5,694,616 A | 12/1997 | Johnson et al. |
| 5,699,275 A | 12/1997 | Beasley et al. |
| 5,717,923 A | 2/1998 | Dedrick |

(Continued)

FOREIGN PATENT DOCUMENTS

EP 0230616 A2 8/1987

(Continued)

OTHER PUBLICATIONS

U.S. Appl. No. 10/211,827, filed Aug. 2, 2002, Nachenberg.

(Continued)

*Primary Examiner*—John Chavis
(74) *Attorney, Agent, or Firm*—Sonnenschein Nath & Rosenthal LLP

(57) ABSTRACT

The present invention is for an apparatus, method and computer readable software medium executable by a processor for automatically installing software applications resident on a plurality of computer terminals in a network. The invention preferably includes a detection module, a generation module, and a transmission module operating on a computer attached to a network. The detection module identifies the executable steps which are required to uninstall a software application from the model computer. The generation module creates a self-executing uninstall package using the executable steps identified by the detection module. The transmission module transmits the self-executing uninstall package to each of the terminals in the network containing the software application which is to be uninstalled. Upon arriving at a terminal, the self-executing uninstall package automatically executes and removes the software application from the terminal.

15 Claims, 6 Drawing Sheets

U.S. PATENT DOCUMENTS

| | | |
|---|---|---|
| 5,729,743 A | 3/1998 | Squibb |
| 5,774,552 A | 6/1998 | Grimmer |
| 5,781,901 A | 7/1998 | Kuzma |
| 5,790,856 A | 8/1998 | Lillich |
| 5,794,210 A | 8/1998 | Goldhaber et al. |
| 5,799,189 A | 8/1998 | Koser et al. |
| 5,832,220 A | 11/1998 | Johnson et al. |
| 5,892,900 A | 4/1999 | Ginter et al. |
| 5,893,113 A | 4/1999 | McGrath et al. |
| 5,903,880 A | 5/1999 | Biffar |
| 5,905,896 A | 5/1999 | Delannoy |
| 5,909,581 A | 6/1999 | Park |
| 5,911,048 A | 6/1999 | Graf |
| 5,917,489 A | 6/1999 | Thurlow et al. |
| 5,933,647 A | 8/1999 | Aronberg et al. |
| 5,933,811 A | 8/1999 | Angles et al. |
| 5,948,058 A | 9/1999 | Kudoh et al. |
| 5,948,104 A | 9/1999 | Gluck et al. |
| 5,953,532 A * | 9/1999 | Lochbaum ............ 717/176 |
| 5,960,204 A | 9/1999 | Yinger et al. |
| 5,960,411 A | 9/1999 | Hartman et al. |
| 5,999,967 A | 12/1999 | Sundsted |
| 6,006,034 A | 12/1999 | Heath et al. |
| 6,006,242 A | 12/1999 | Poole et al. |
| 6,035,423 A | 3/2000 | Hodges et al. |
| 6,052,531 A | 4/2000 | Waldin, Jr. et al. |
| 6,057,841 A | 5/2000 | Thurlow et al. |
| 6,073,142 A | 6/2000 | Geiger et al. |
| 6,081,814 A | 6/2000 | Mangat et al. |
| 6,088,803 A | 7/2000 | Tso et al. |
| 6,092,080 A | 7/2000 | Gustman |
| 6,119,165 A | 9/2000 | Li et al. |
| 6,134,685 A | 10/2000 | Spano |
| 6,138,146 A | 10/2000 | Moon et al. |
| 6,145,079 A | 11/2000 | Mitty et al. |
| 6,146,026 A | 11/2000 | Ushiku |
| 6,147,977 A | 11/2000 | Thro et al. |
| 6,151,643 A | 11/2000 | Cheng et al. |
| 6,161,130 A | 12/2000 | Horvitz et al. |
| 6,161,181 A | 12/2000 | Haynes, III et al. |
| 6,178,551 B1 * | 1/2001 | Sana et al. ............ 717/140 |
| 6,185,603 B1 | 2/2001 | Henderson et al. |
| 6,199,081 B1 | 3/2001 | Meyerzon et al. |
| 6,260,059 B1 | 7/2001 | Ueno et al. |
| 6,510,552 B1 | 1/2002 | Benayoun et al. |
| 6,345,256 B1 | 2/2002 | Milsted et al. |
| 6,349,407 B1 | 2/2002 | Towfiq |
| 6,363,415 B1 | 3/2002 | Finney et al. |
| 6,374,237 B1 | 4/2002 | Reese |
| 6,418,555 B2 * | 7/2002 | Mohammed ............ 717/169 |
| 6,421,669 B1 | 7/2002 | Gilmour et al. |
| 6,460,036 B1 | 10/2002 | Herz |
| 6,460,050 B1 | 10/2002 | Pace et al. |
| 6,484,315 B1 * | 11/2002 | Ziese ............ 717/173 |
| 6,490,587 B2 | 12/2002 | Easty et al. |
| 6,493,722 B1 | 12/2002 | Daleen et al. |
| 6,535,894 B1 | 3/2003 | Schmidt et al. |
| 6,609,196 B1 | 8/2003 | Dickinson, III et al. |
| 6,651,249 B2 | 11/2003 | Waldin et al. |
| 2001/0018739 A1 | 8/2001 | Anderson et al. |
| 2002/0007400 A1 | 1/2002 | Pedersen |
| 2004/0133776 A1 * | 7/2004 | Putzolu ............ 713/153 |

FOREIGN PATENT DOCUMENTS

| | | |
|---|---|---|
| EP | 0735474 A2 | 10/1996 |
| EP | 0774720 A2 | 5/1997 |
| WO | WO 96/32679 A1 | 10/1996 |
| WO | WO 99/22325 | 5/1999 |
| WO | WO 00/29945 | 5/2000 |

OTHER PUBLICATIONS

"User-Friendly Interface for Applying Specific Levels of Coordinated Updates to Software in the Field," IBM Technical Disclosure Bulletin, vol. 31, No. 10, Mar. 1989, Armonk, NY, U.S.A.

Ambriola, Vincenzo; Bendix, Lars; and Ciancarini, Paolo, "The Evolution of Configuration Management and Version Control, " Software Engineering Journal, Nov. 1990, pp. 303-310, retrieved from IEEE database, Sep. 24, 2002, U.S.A.

Conradi, Reidar and Westfechtel, Bernhard, "Configuring Versioned Software Products," Department of CS and Telematics, Norwegian Institute of Technology, Trondhiem, Norway, 1996, retrieved from http://citeseer.ni.nec.com/conrad96 on Sep. 24, 2002.

Grundy, et al., "Support For Collaborative, Integrated Software Development," Proc 95 Software Engineering Environments, Abstract Only, Apr. 1995, U.S.A.

Hedin, Gorel, "Incremental Execution In A Programming Environment Based On Compilation," Proc. Of Nineteenth Hawaii Intl. Conf. On System Sciences, Abstract Only, Jan. 1986, U.S.A.

Hurwitz Group, "Applicaton Management for Distributed Applications, " pp. 1-7, Jun. 1998, U.S.A.

Lindsay, Peter; Liu, Yaowei, and Traynor, Owen, "A Generic Model for Fine Grained Configuration Management Including Version Control and Traceability," 1997 IEEE, retrieved from the IEEE database Sep. 24, 2002, U.S.A.

Marimba, "Castanet 3.0 Product Family," Jun. 1998, U.S.A.
Marimba, "Castanet Infrastructure Suite," Jun. 1998, U.S.A.
Marimba, "Castanet Management Suite," Jun. 1988, U.S.A.
Marimba, "Castanet Production Suite," Jun. 1998, U.S.A.

Pocket Soft, ".RTPatch® Professional for Windows, NT, and DOS Binary Update System," pp. 1-6, Jun. 23, 1998, http://www.pocketsoft.com\whtwind.html, U.S.A.

Pollock, Lori, "Incremental Version of Iterative Data Flow Analysis," IEEE Trans Software Eng., v 15, n 12, Abstract Only, Dec. 1989, U.S.A.

Reichenberger, Christoph, "Orthogonal Version Management," Universitat Linz, Institute fur Informatik, Austria, 1989, ACM.

Suk Oh, AM, et al. "An Incremental Update Propagation Scheme For A Cooperative Transaction Model," Proc. 7th Intl. Workshop On Database And Expert Systems Appl, Abstract Only, Sep. 1996, U.S.A.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Cranor, Faith, L., LaMacchia, Brian A., "Spam!" Communications of the ACM, vol. 41, No. 8, pp. 74-83, Aug. 1998.

Kneipp, Ray, Traffic Shaping [Online], May 14, 2001, [retrieved from the Internet on Apr. 27, 2004] Retrived from the Internet: <URL: Itworld.com—supersite manager—Traffic Shaping http://www.itworld.com/sup_mgr/05142001/>.

ISP-Planet Staff, Slower Spam Would Annoy Spammers [Online] Feb. 20, 2003, [retrieved from the Internet on Apr. 22, 2005]. Retrieved from the Internet: <URL: ISP-Planet—Equipment—Slower Spam Would Annoy Spammers, http://www.isp-planet.com/equipment/2003/spamsquelcher.html>.

Wagner, Mitch, "Tool Users Network Analysis to Fight Spam" [Online] retrieved from the Internet on Apr. 22, 2005] Retrieved from the Internet: <URL: Internet Week>E-mail>Tool Uses Network Analysis to Figh Spam> Feb. 13, 2003, http://www.internetweek.com/story/showarticle.jhtml?articleID=6900032>.

PR Newswire, "Spam Squelcher Technology Cuts Costly Impact of Spam on Enterprises and ISPs;" New Product from ePrivcacy Group turns back Spam Attacks with False Positives, [Online] Feb. 11, 2003, [Retrieved from the Internet on May 3, 2004]. Retrieved from the Internet: <URL: PR Newswire Spam Squelcher Technology Cuts Costly Impact of Spam on Enterprises and ISPs http://www.findarticles.com/cf_dis/m4pm/2003_Feb_11/97463210/p1/article. jhtml>.

* cited by examiner

METHOD AND APPARATUS FOR AUTOMATICALLY UNINSTALLING SOFTWARE ON A NETWORK

CROSS-REFERENCE TO RELATED PATENT APPLICATIONS

The present application claims priority from provisional U.S. Patent Application Ser. No. 60/218,310, for "Method and Apparatus for Automatically Uninstalling Software on a Network," filed Jul. 14, 2000, the disclosure of which is incorporated herein by reference.

BACKGROUND OF THE INVENTION

1. Technical Field

This invention pertains to the field of uninstalling software applications. More particularly, the invention pertains to the field of uninstalling software applications which are resident on a plurality of computer terminals within a network.

2. Background Art

As software applications are installed onto a computer, the installation process will generally alter the computer's registry as well as install new files both outside and within the application's home directory. As a result, the removal of installed software applications from a computer is often much more complicated than merely deleting the software's home directory. In order to minimize the difficulty of removing software applications from a computer, uninstallation software packages have been commercially developed to identify all of the files installed by the software installation and subsequently remove these files. There are generally two types of commercially available uninstallation software packages.

A first type of uninstallation software package is a pre-packaged uninstalling program that is sold in conjunction with a software application. A pre-packaged uninstalling program is designed to specifically remove only the corresponding software application with which it is packaged. It operates by specifically removing those files installed when the corresponding software application was loaded onto the computer. The files installed and removed are dictated by user-defined selections which are made during the uninstallation process.

The second type of uninstalling software is a general uninstalling program which must be resident on a computer at the time the software application to be uninstalled was installed. This type of uninstalling software records the install-time activities of a software application as it is subsequently installed on the specific computer terminal and generates an uninstall file designed to remove those files specifically installed when the software application was loaded onto the computer terminal.

When a software application is installed on a computer, a user often customizes the installation by selecting a version of the software as well as defining run-time options that a software application will perform during its execution. A pre-packaged uninstall program normally comes packaged with a corresponding software application and contains multiple uninstalling options. The pre-packaged uninstall program requires a user to locally identify the version of the installed software application prior to the actual removal of the software application. Additionally, the pre-packaged uninstall program normally requires a user to locally input any customization options of the software application which were chosen during the installation process. From these inputs, the pre-packaged uninstall program identifies the necessary uninstalling options required to remove the particular software application from the computer. As a result, prior to the actual removal of a software application, this first type of uninstallation software package requires a user to select the correct uninstalling options corresponding to the customization options of the software application which were chosen during the installation process. Because this first type of uninstallation software package requires a user to interface with the computer upon which the software application is located, this type of uninstallation software package cannot efficiently remove software on a large number of computer terminals in a network.

A general uninstall program must be placed on the computer prior to installation of the software applications that will be later removed. Examples of a general uninstall program include the Norton Uninstaller and the McAffee Uninstaller. A general uninstall program records the install-time activities of software applications as they are installed on the computer. From this record of install-time activities, the general uninstall program is able to monitor the files that are downloaded and changes in the computer registry during the installation of the software application. Thereafter, when a user wishes to uninstall the software application, a general uninstall program removes the files created as well as the changes in the computer registry that were recorded during the software installation. However, because this type of uninstallation software package must be present on a computer prior to the software installation, it cannot efficiently remove software on a large number of computer terminals on a network wherein the software was previously installed without all computers on the network having this type of general uninstall file. Additionally, this type of uninstallation software package must be locally triggered on each individual computer terminal in order to remove a specific software application resident on that computer terminal.

As shown above, the prior art does not efficiently remove software applications resident on a large number of computer terminals in a network. If a user wants to use either type of uninstallation software package, the user must interface with each computer terminal. As a result, the removal of software applications on a large number of computer terminals requires a great amount of time for the user to interface with each computer terminal. What is needed is a method for allowing a user to remotely remove software applications on a large number of computer terminals in a network without having to interface with each individual computer terminal in the network.

SUMMARY OF THE INVENTION

The present invention is an apparatus, method and computer readable software medium executable by a processor for automatically uninstalling software applications (130) resident on computer terminals (120) in a network. In a preferred embodiment, the invention is implemented within a model computer (110) and is used to generate a self-executing uninstall package (230). This self-executing uninstall package is then transmitted to each individual terminal (120) in the network. The invention preferably includes a detection module (310), a generation module (320), and a transmission module (330). The detection module (310) identifies the removal steps (340) required to uninstall a software application (130) from the model computer (110). The generation module (320) creates a self-executing uninstall package (230) from the removal steps (340) identified by the detection module (310). The transmission module (330) transmits the self-executing uninstall package (230) to each of the terminals (120) in the network containing the software application. Upon arriving at a terminal (120), the self-executing uninstall package (230) automatically executes and removes the software application from the terminal (120).

BRIEF DESCRIPTION OF THE DRAWINGS

These and other more detailed and specific objects and features of the present intention are more fully disclosed in the following specification, reference being had to the accompanying drawings, in which.

DETAILED DESCRIPTION OF THE PREFERRED EMBODIMENTS

Figure 1:
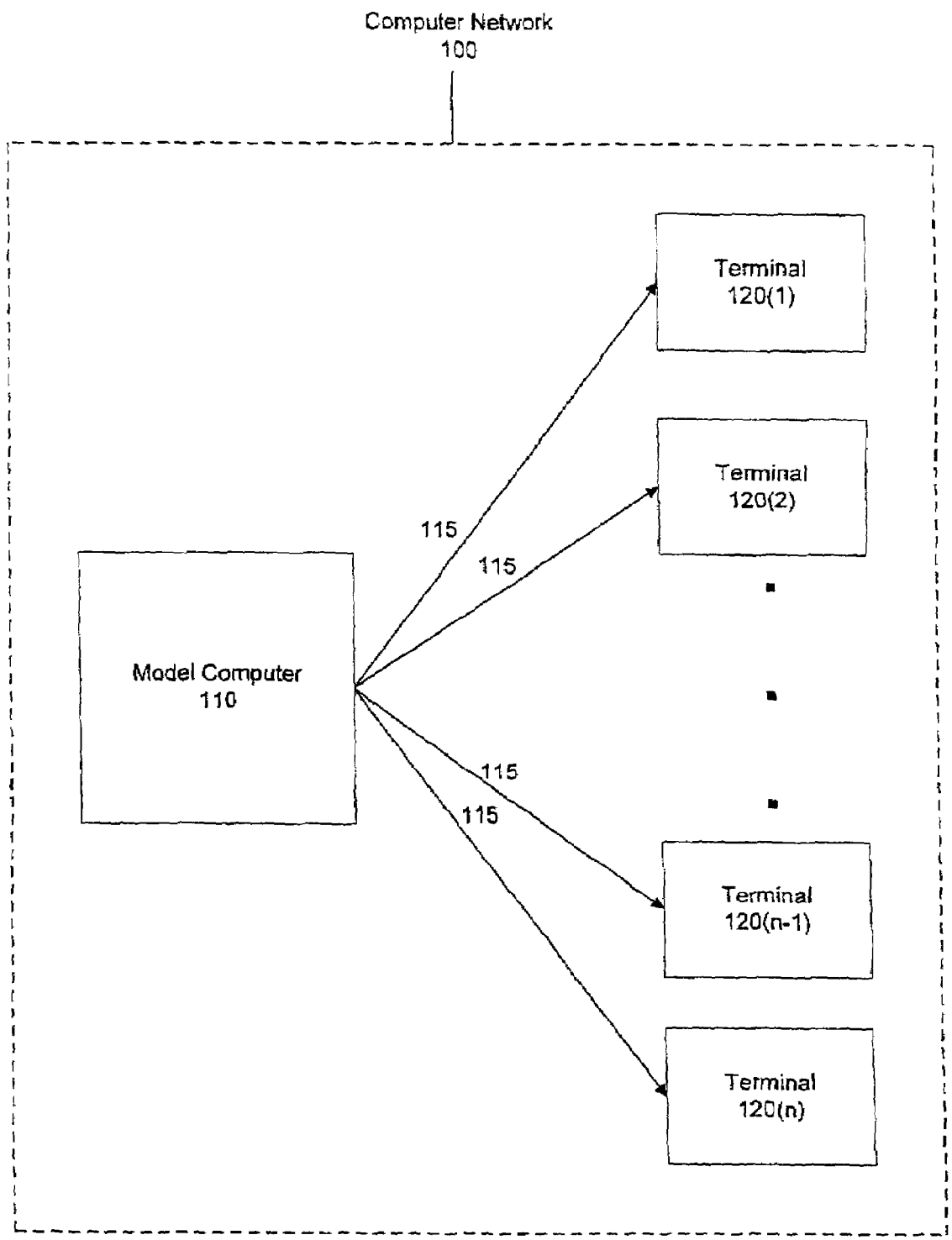
FIG. 1 is a block diagram illustrating a network containing a plurality of computer terminals (120) and a model computer (110) on which the present invention is implemented in hardware, firmware or software.

The present invention generates a self-executing uninstall package (230) capable of automatically removing a software application (130) from a plurality of computer terminals (120) within a network. In a preferred embodiment, the present invention is implemented in hardware, firmware or software on a model computer (110). Preferably, the model computer is one of the computer terminals in the computer network. After the self-executing uninstall package (230) is created, it is transmitted to each of the computer terminals (120) in the computer network (100) that contain the software application (130). After the self-executing uninstall package (230) is received by a computer terminal (120), it uninstalls the software application (130) without requiring any user interaction or interface at the computer terminal (120).

In a preferred embodiment, the present invention effectively determines the minimum run-time components required to completely remove a software application from a computer terminal (120). From these minimum run-time components, the invention generates a self-executing uninstall package (230). Thereafter, the self-executing uninstall package is downloaded to each individual terminal within a network in order to automatically remove the software application from each computer terminal in a network. Because this uninstall package (230) is self-executing, an individual is not required to locally interface with any of the computer terminals (120) in order to remove the software. As a result, software (130) contained on a large number of computer terminals (120) in a large network can be quickly and easily removed. Moreover, because the self-executing uninstall package (230) contains a minimum number of run-time components, the bandwidth required to transmit this self-executing uninstall package (230) to each computer terminal (120) on the network (100) is minimized.

The present invention offers the following advantages over the prior art:
 The ability to remotely remove software applications from multiple computer terminals in a computer network
 The ability to minimize the bandwidth required to transmit an uninstall package within a computer network
 The ability to remotely verify that all the files and registry changes associated with a computer application have been uninstalled
 The ability to avoid user interface on local computer terminals as software is removed from each local terminal
 The ability to identify specific local computer terminals to which the self-executing uninstall package is sent resulting in the subsequent self-execution of the uninstall package and removal of the software application from the specific local computer terminals FIG. 1 illustrates a computer network (100) having a model computer (110) in which a preferred embodiment of the present invention is implemented. As shown, the network (100) contains multiple computer terminals (120)(1)-(n), with each individual terminal having a corresponding network address that identifies the specific computer terminal on the network (100). The computer terminals (120)(1)–(n) are coupled together via transmission mediums, such as computer cables or infrared transceivers (115), which allow data to be transmitted between each of the computer terminals (120)(1)–(n) in the network (100).

It is understood that the model computer (110) contains a copy of a software application (130) which is to be uninstalled from each of the other computer terminals (120)(1)–(n) in the network. The present invention is implemented on the model computer (110) and is used to generate a self-executing uninstall package that will be transmitted to at least one computer terminal (120) in the network (100) containing the software application (130). As shown in FIG. 1, the model computer (110) is preferably locally coupled to the network (100), thereby allowing quick and easy generation and transmission of the self-executing uninstall package. However, the model computer (110) may be coupled to the network through an intranet or internet or may be completed separate from the network (100); in which instance, the self-executing uninstall package must be generated first on the model computer (110) and then downloaded onto at least one of the computer terminals (120)(1)–(n) on the network 100. Thereafter, the self-executing uninstall package will be transmitted to the other computer terminals (120)(1)–(n) in the network (100).

Figure 2:
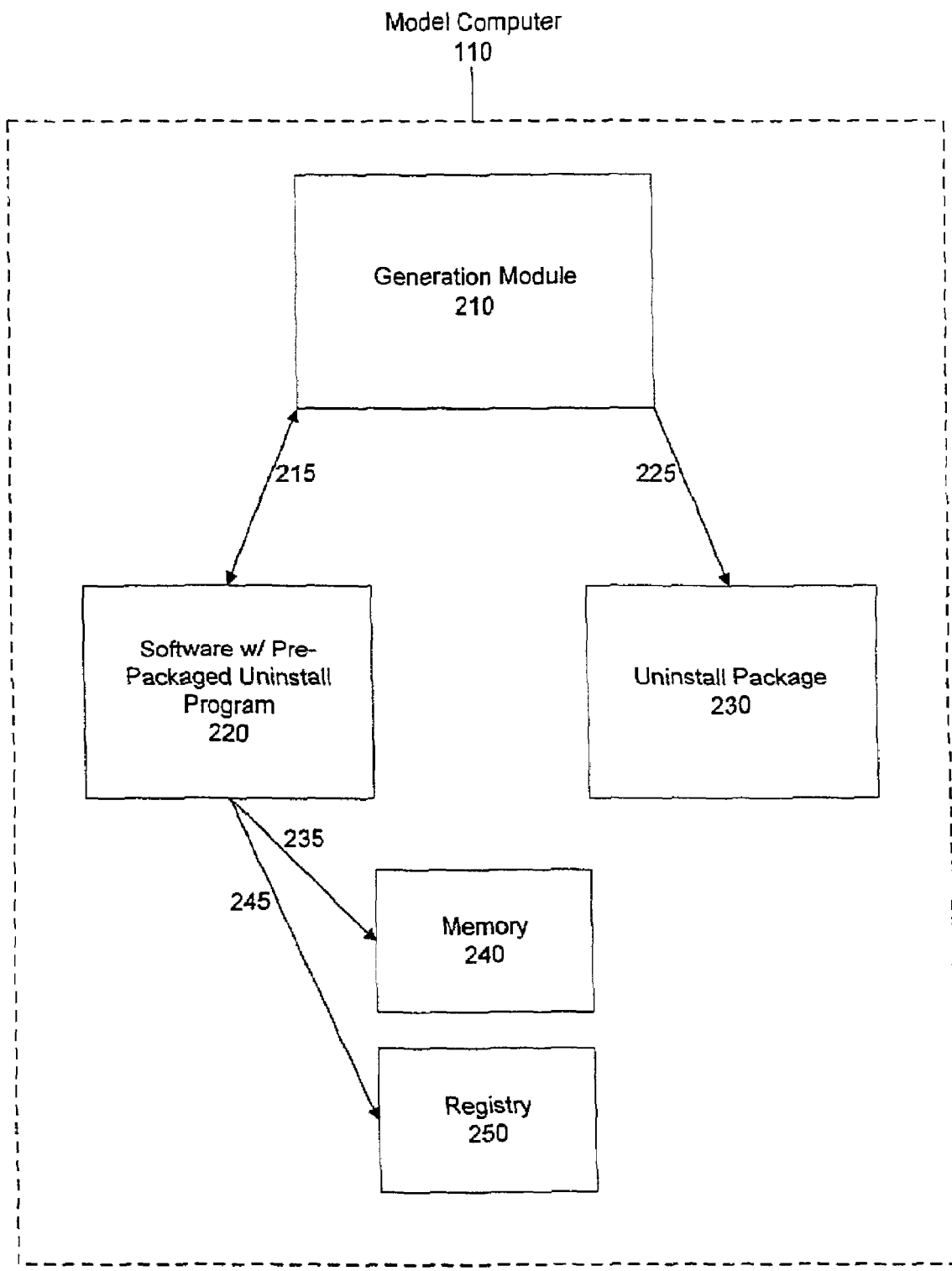
FIG. 2 is a block diagram showing the component parts of a first preferred embodiment of the present invention.

FIG. 2 illustrates a first preferred embodiment of the present invention. A pre-packaged uninstall program (220) is loaded onto the model computer during the installation of the software application (130). This pre-packaged uninstall program (220) is designed to identify the exact version and installation process of the software application (130). To accomplish this identification, the uninstall program (220) requires a user to interface with the model computer and input the necessary information. For example, the uninstall program (220) will interface with a user via multiple pop-up boxes that ask specific questions. Typical questions may relate to the version of the software that was installed or whether the installation was fully or partially installed. A user is normally required to answer the questions in the pop-up boxes by pressing either a yes/no button or one of a list of answer buttons on each pop-up box. From the information inputted by the user, the pre-packaged uninstall program (220) selects the operating steps required to remove the software application from the computer. The operating steps are selected from a list of steps in the pre-packaged uninstall program (220) corresponding to the different possible versions and/or installation options of the software application which have been selected by the user. Thereafter, the pre-packaged uninstall program (220) uninstalls the software application from the computer.

This uninstallation process generally consists of removing the software application's commands and paths from the model computer's registry (250) and removing the corresponding files within the model computer's memory (240). A generation module (210) monitors the actual uninstall steps performed by the pre-packaged uninstall program based upon the user inputs as the software application (130) is removed. As a result, the generation module (210) identifies all the actual steps required to remove the software application based upon the user inputs. From these identified steps, the generation module (210) creates a self-executing uninstall package (230) which will perform each of these identified steps as if the user the user inputs were the same each time the uninstallation process was executed. This self-executing uninstall package (230) may be a batch file or computer script containing program code designed to perform the actual removal steps identified by the generation module.

After creating the self-executing uninstall package (230), the present invention transfers the self-executing uninstall package to a transmission module (330). The transmission module (330) identifies the computer terminals (120) in the network containing the software application (130) that will be uninstalled. The transmission module transmits copies of the self-executing uninstall package (230) to each of the terminals in the network identified as containing the software application to be installed. Each of the copied self-executing uninstall packages is given an address tag corresponding to a particular identified computer terminal (120) containing the software application (130). Thereafter, each self-executing uninstall package (230) is transmitted from the transmission module (330) to a computer terminal (120) corresponding to the address tag. Upon arriving at the computer terminal (120), each self-executing uninstall package executes without interfacing with a user and uninstalls the software application (130) from the terminal. This uninstall occurs automatically without requiring a user to repeat the process at each individual terminal in the network. Instead, the self-executing uninstall package will execute all of the steps as if the user input the same responses and information as that which were given when the uninstall process was executed on the model computer.

Figure 3:
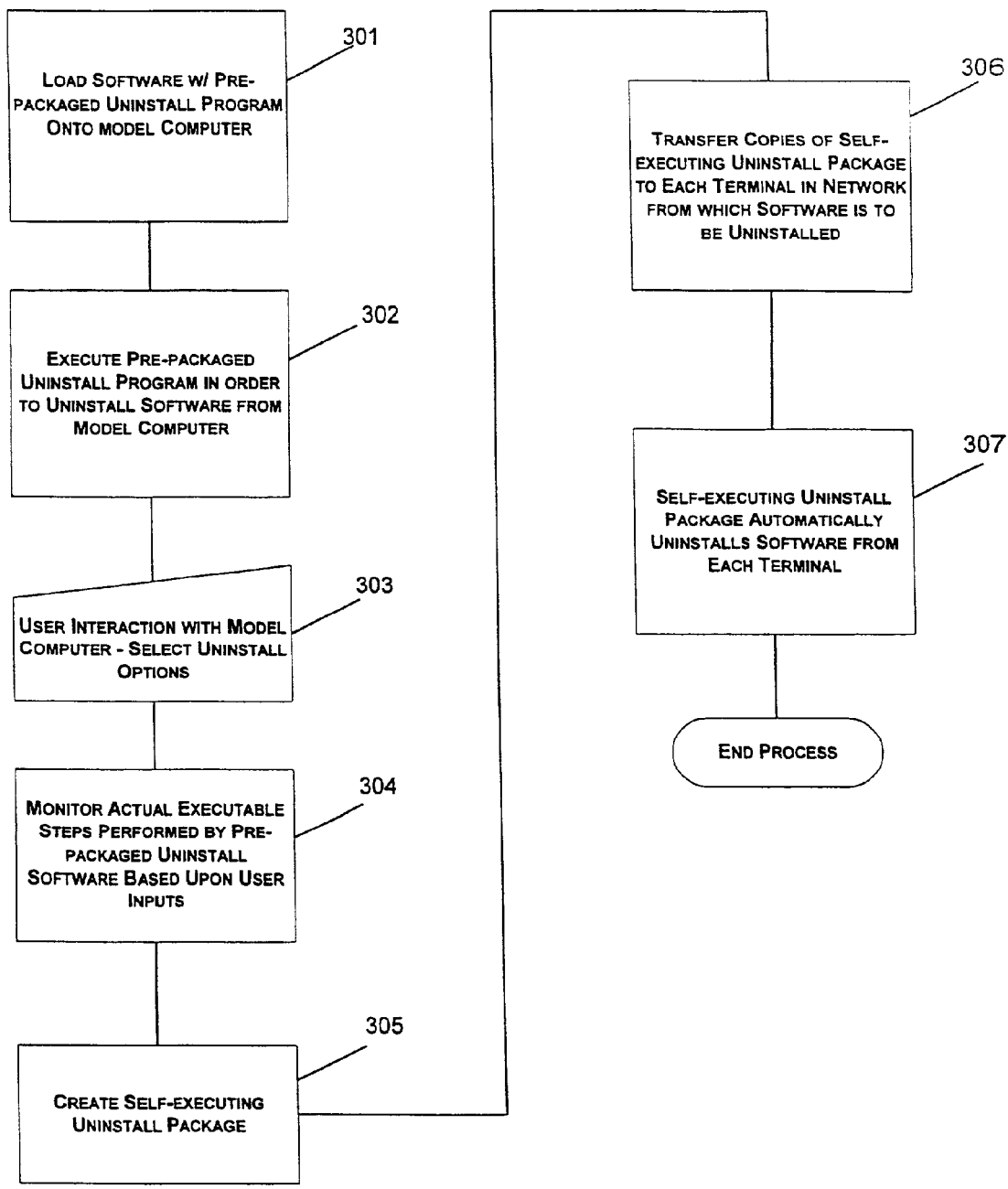
FIG. 3 is a flow chart illustrating a process for uninstalling software on a plurality of terminals in a computer network in accordance with a first preferred embodiment of the present invention.

FIG. 3 illustrates a flow chart showing each of the steps in a first preferred embodiment of the present invention. As shown, in a first step (301) a copy of the software to be uninstalled from each terminal in the network is loaded onto a model computer along with a pre-packaged of uninstall program (Step 301). The pre-packaged uninstall program is then executed (Step 302). A user interacts with the model computer in order to input information and select uninstall options as required during execution of the pre-packaged uninstall program (Step 303). A generation module monitors the steps performed by the pre-packaged uninstall program as the software is uninstalled, tracking the actual uninstall process and the steps executed based upon the user inputs and uninstall options selected (Step 304). The generation module creates a self-executing uninstall package which includes the minimum real time steps executed or performed by the pre-packaged uninstall programs as a result or function of the user interaction (Step 305). Copies of the self-executing uninstall package are then transmitted to each of the computer terminals in the network identified as containing the software application to be uninstalled (Step 306). Upon arriving at a particular terminal in the network the self-executing uninstall package will execute all of the steps required to uninstall the software from the terminal, as if the user input the same responses and information as that which were given when the uninstall process was executed on the model computer (Step 307).

Figure 4:
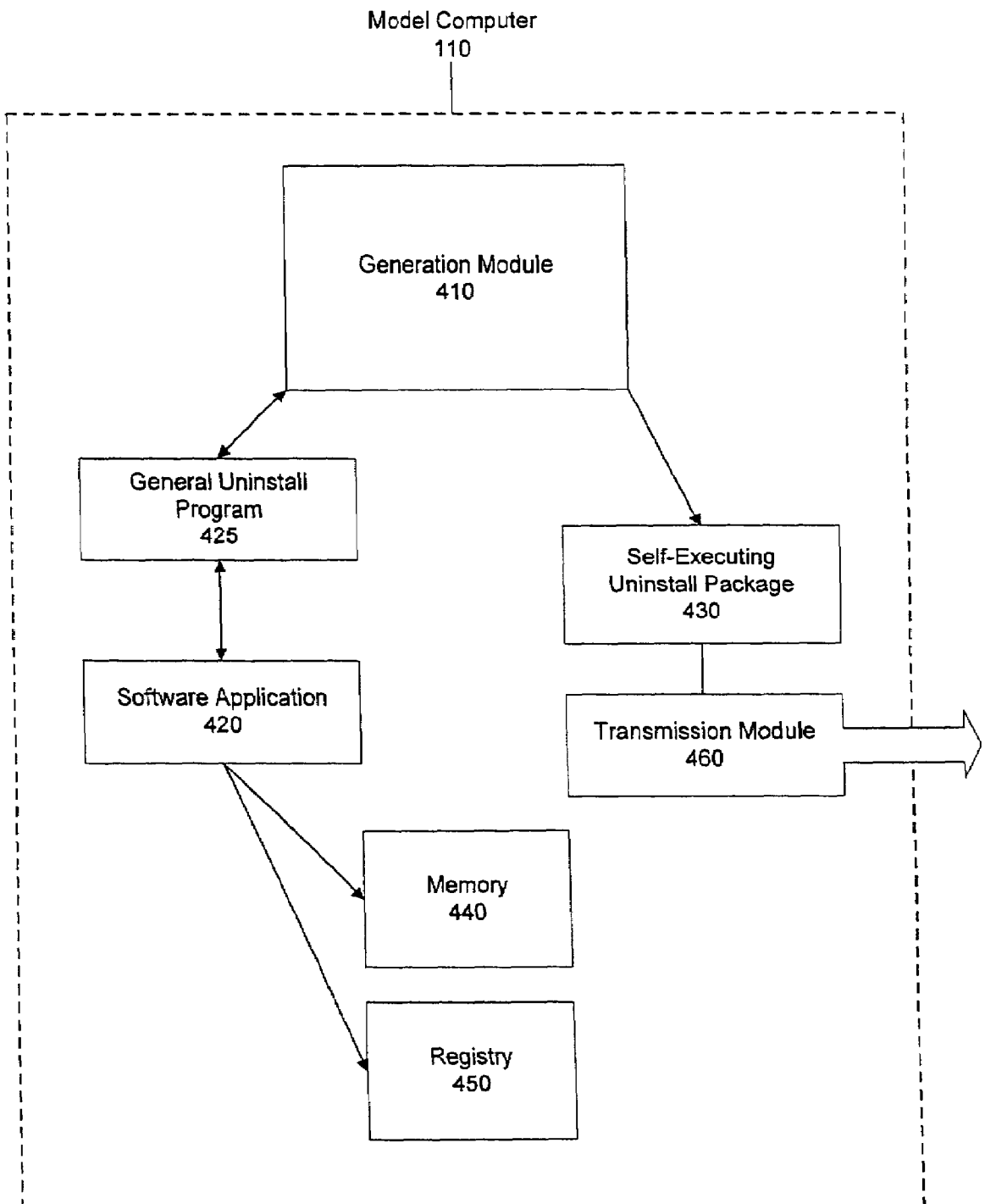
FIG. 4 shows a second preferred embodiment of the present invention whereby a self-executing uninstall package (430) is created using a record of the install-time activities monitored and recorded as a software application (420) is installed on the model computer (110)

FIG. 4 shows a second preferred embodiment of the present invention whereby a self-executing uninstall package (430) is created using a record of the install-time activities monitored and recorded as a software application (420) is installed on the model computer (110). In this embodiment, the model computer (110) contains a general uninstall program (425) which records the install-time activities as the software application (420) to be uninstalled from each of the other terminals in the network is installed on the model computer. In this second preferred embodiment, the general uninstall program (425) must exist on the model computer (110) prior to the installation of the software application (420). Thereafter, the general uninstall program (425) records the install-time activities as the software application (420) is installed on the model computer (110). These install-time activities may include but are not limited the installation of files in the model computer's memory (440) and any changes made to the computer registry (450).

As explained earlier, when the software application (420) is installed, a user will typically select different installation options and various files will be generated in the computer memory (440) and/or entries in the computer registry (450) will be created depending upon the options selected. The general uninstall program (425) monitors these install time activities and tracks which files/entries are created during the installation process as a result of the options selected. As a result, the general uninstall program (425) creates a record of the actual steps performed during the installation of the software application. A generation module (410) uses these recorded steps to subsequently create a self-executing uninstall package. The self-executing uninstall package includes executable software routines necessary to undo the steps performed during the installation of the software application on the model computer (110). The generation module (410) is able to identify these steps from the stored install-time activities of the software application (420) recorded by the general uninstall program (425). From this record of the software application's install-time activities, the generation module (410) creates the self-executing uninstall package (430) which includes executable software routines necessary to undo the installation process. The self-executing uninstall package (430) will contain software routines and executable code necessary to remove all of the downloaded files from the memory (340) and undo all of the changes in the computer registry (350) performed during the installation of the software application (420).

After creating the self-executing uninstall package (430), the generation module (410) sends the self-executing uninstall package (430) to a transmission module (460). The transmission module (460) identifies the computer terminals (120)(1)–(n) in the network (100) containing the software application (420) to be removed. Copies of the self-executing uninstall packages (430) are made in the transmission module (460), with the total number of copies equal to the total number of terminals from which the software application (420) is to be uninstalled. Each copy is given an address tag corresponding to a particular identified computer terminal (120)(n)–(1). Thereafter, the copies of the self-executing uninstall package (430) are transmitted from the transmission module (460) to each individual computer terminal (120)(1)–(n) corresponding to the address tag given to that copy. Upon arriving at a computer terminal (120)(1)–(n) in the network, each self-executing uninstall package (430) automatically executes and uninstalls the software application (420) without requiring any further user interfacing.

Figure 5:
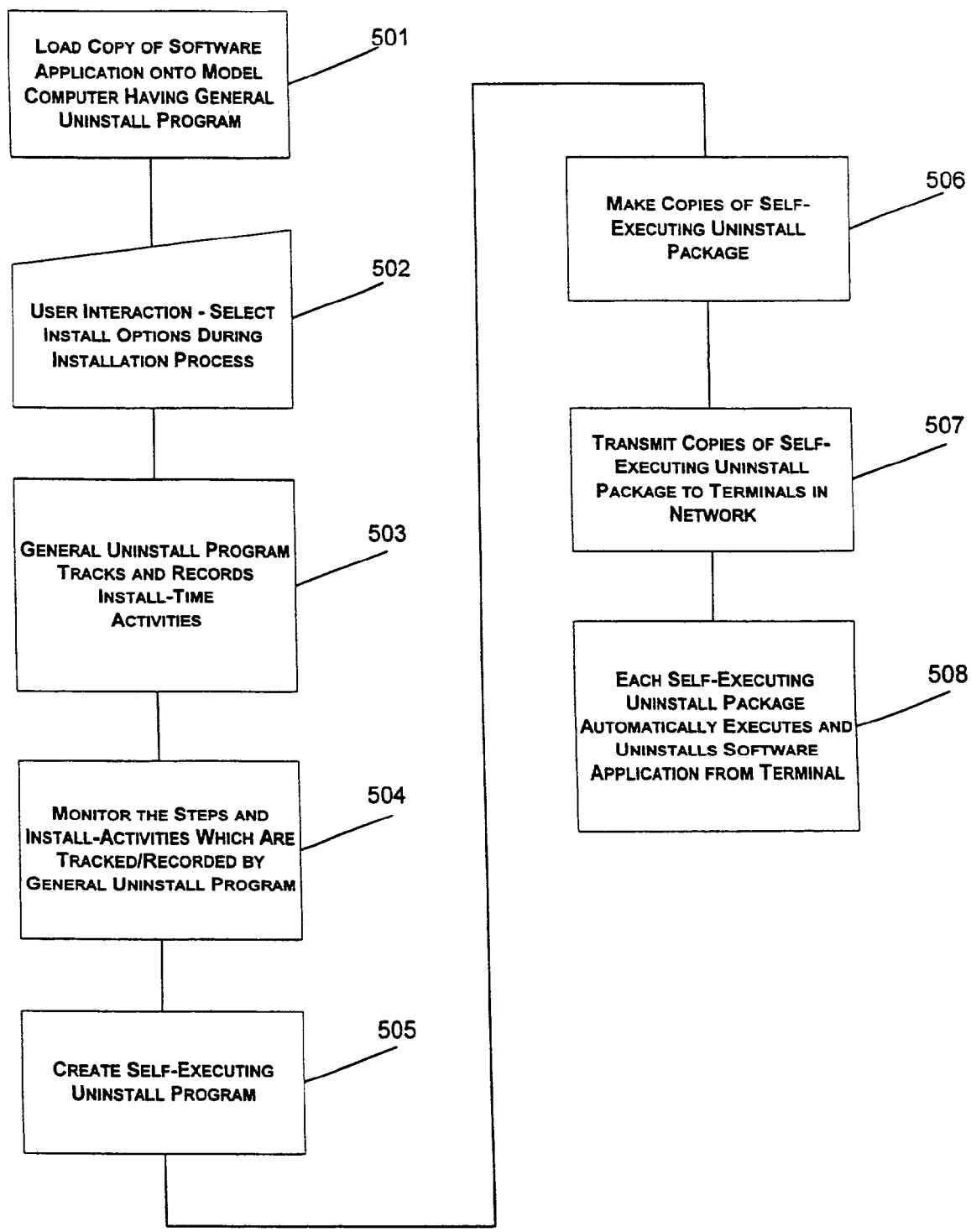
FIG. 5 illustrates a flowchart showing a process for uninstalling a software program from a plurality of terminals in a network in accordance with a second preferred embodiment of the present invention.

FIG. 5 illustrates a flowchart showing a process for uninstalling a software program from a plurality of terminals in a network in accordance with a second preferred embodiment of the present invention. As shown, in a first step (Step 501) a copy of the software to be uninstalled from each terminal in the network is loaded onto a model computer having a general uninstall program already resident on the model computer (Step 501). A user interacts with the model computer in order to input information and select install options as required during installation of the software application (Step 502). The general uninstall program will track and record the install-time activities executed on the model computer as the software application is uninstalled (Step 503). A generation module monitors the steps tracked and recorded by the general uninstall program as the software application is installed, tracking the actual install process and the steps executed based upon the user inputs and install options selected (Step 504). The generation module creates a self-executing uninstall package which includes the minimum real time steps needed to undo the actual steps executed or performed as a result or function of the user interaction during the installation of the software application (Step 505). Copies of the self-executing uninstall packages are made, with the total number of copies equal to the total number of terminals from which the software application is to be uninstalled, and each copy is given an address tag corresponding to a particular identified computer terminal (Step 506). Thereafter, the copies of the self-executing uninstall package are transmitted to each individual computer terminal corresponding to the address tag given to that copy (Step 507) Upon arriving at a computer terminal in the network, each self-executing uninstall package automatically executes and uninstalls the software application without requiring any further user interfacing (Step 508).

Figure 6:
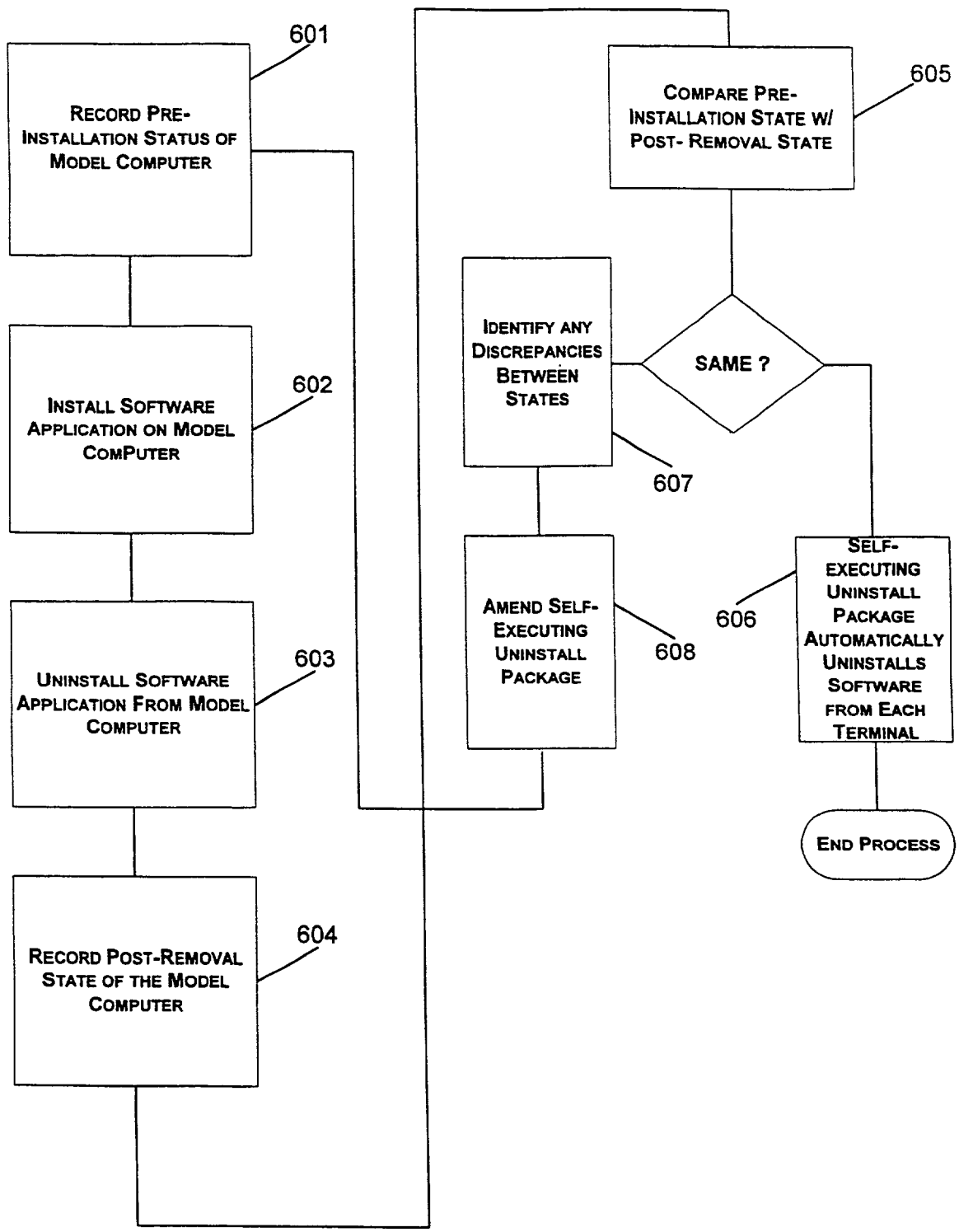
FIG. 6 illustrates a preferred method for verifying whether a self-executing uninstall package will completely remove the software application.

It is further desirable to be able to ensure that the self-executing uninstall package will completely uninstalls the software application and all of the files and registry entries associated therewith before transferring the self-executing uninstall package to each of the individual terminals. FIG. 6 illustrates a preferred method for verifying whether a self-executing uninstall package will completely remove the software application.

This verification method allows the model computer to compare the its pre-installation file and registry state to its post-removal file and registry state resulting from the installation and subsequent removal of the software application. This verification method is performed after a self-executing uninstall package has been generated but before it is copied and transferred to each of the individual terminals in the network.

In order to verify the correct operation of the self-executing uninstall package, a model computer (not yet having a coy of the software application installed thereon, or from which any copies of the software application have been fully removed) will record its pre-installation state (Step 601). This pre-installation state includes a list of all the files contained within the memory as well as a copy of its registry prior to installation of the software application.

The software application is then installed on the model computer (Step 602) and then removed from the model computer using the self-executing uninstall package (Step 603). After the self-executing uninstall package has completed all of its software routines and completed the process of uninstalling the software application, the model computer records its post-removal state (Step 604). This post-removal state includes a list of all the files contained within the memory as well as a copy of the model computer's registry after removal of the software application by the self-executing uninstall package. Finally, the model computer compares the recorded pre-installation state to the recorded post-removal state and identifies any discrepancies between the two states (Step 605).

If the model computer does not find any discrepancies between the two states, then the self-executing uninstall package works properly and completely removes the software application. As a result, the self-executing uninstall package can be copied and transmitted to at least one computer terminal in the network and the user is assured that the software application will be completely removed (Step 606). If the model computer finds discrepancies between the two states, then the model computer will identify these discrepancies (Step 607). In this instance, the post-removal state will generally contain files not contained in the pre-installation state. Additionally, the model computer may identify any discrepancies between the registry in the pre-installation state and the post-installation state. As a result, the model computer will amend the self-executing uninstall package to include additional code and/or software routines necessary to insure that these discrepancies are remedied (Step 608). For example, the model computer may amend the self-executing uninstall package to include a computer command to delete a specific application file in the post-removal state that was not originally removed by the original self-executing. After amending the original self-executing uninstall package, the verification method is once again repeated using the newly amended self-executing uninstall package. This verification method is continually performed until a complete and amended self-executing uninstall package is created which completely removes the software application from the model computer. Thereafter, the self-executing uninstall package can be transmitted to at least one computer terminal in the network and the user is assured that the software application will be completely removed from each computer terminal.

The above description is included to illustrate the operation of the preferred embodiments and is not meant to limit the scope of the invention. The scope of the invention is to be limited only by the following claims. From the above discussion, man variations will be apparent to one skilled in the art that would yet be encompassed by the spirit and scope of the present invention.

What is claimed is:

1. A computer implemented method for automatically uninstalling a software application resident on at least one computer terminal in a network, the method comprising:
    identifying steps required to uninstall an instance of the software application resident on a model computer;
    generating a self-executing standalone uninstall package from information obtained in the identifying step, said uninstall package adapted to automatically remove the software application from the at least one computer terminal; and transmitting the uninstall package to the at least one terminal, whereupon the uninstall package automatically removes the software application from the at least one computer terminal.

2. The computer-implemented method of claim 1, wherein the uninstall package is generated by executing the steps of:

removing the software application from the model computer by using a corresponding uninstall program having a plurality of executable uninstall options, wherein said uninstall program is adapted to interface with a user in order to select which of the plurality of executable uninstall options are to be executed;

recording the uninstall options selected from the plurality of executable uninstall options within the uninstall program; and generating the uninstall package from the recorded selected uninstall options.

3. The computer-implemented method of claim 1, wherein the uninstall package is generated by executing the steps of:

installing the software application on the model computer;

maintaining a record of the software application's install-time activities on the model computer; and generating the uninstall package from the record of the software application's install-time activities.

4. The computer implemented method of claim 1 wherein the uninstall package contains a minimum number of run-time components required for removal of the software application from the at least one computer terminal.

5. The computer implemented method of claim 1 wherein the transmitting step includes:

identifying at least one specific computer terminal from which the software application will be removed; and transmitting the uninstall package solely to the at least one specific computer terminal, whereupon the uninstall package executes itself and removes the software application.

6. The computer implemented method of claim 1 further comprising the steps of:

maintaining a record of the model computer's file system prior to installation of the software application;

installing the software application and subsequently executing the uninstall package on the model computer;

verifying that the uninstall package completely removed all files and registry entries associated with the software application by comparing the model computer's resulting file system to the maintained pre-installation record of the model computer's file system; and modifying the uninstall package if necessary so that the model computer's file system after executing the uninstall package is equivalent to the maintained pre-installation record of the model computer's file system.

7. Apparatus in a model computer for automatically uninstalling a software application resident on at least one computer terminal in a network, the apparatus comprising:

a detection module adapted to identify, by means of using a model computer as a test bed, all the removal steps required to uninstall the software application from the at least one computer terminal;

a generation module adapted to create a self-executing standalone uninstall package from the identified removal steps in the detection module, said uninstall package adapted to remove the software application from the at least one computer terminal; and a transmission module adapted to transmit the uninstall package to the at least one computer terminal, whereupon the uninstall package automatically executes itself and removes the software application.

8. The apparatus of claim 7 wherein the uninstall package comprises:

an uninstall program, resident on the model computer, containing a plurality of executable uninstall options corresponding to removal of the software application, said uninstall program adapted to interface with a user in order to select which of the plurality of executable uninstall options are to be executed; wherein the detection module is further adapted to record the uninstall program's selection of the executable uninstall options; and the generation module is further adapted to generate the uninstall package from the recorded selection of executable uninstall options.

9. The apparatus of claim 7 wherein:

the detection module is further adapted to record the software application's install-time activities during installation on the model computer and identify the removal steps required to remove the software application; and the generation module is further adapted to create the uninstall package from the identified removal steps in the detection module.

10. The apparatus of claim 7 wherein the uninstall package contains a minimum set of run-time components required to uninstall the software application.

11. The apparatus of claim 7 wherein:

the model computer maintains a first record of the file system and registry prior to installation of the software application;

the uninstall package removes the software application from the model computer;

the model computer creates a second record of the file system and registry after the software application is removed;

a verification module compares the first record of the file system and registry to the second record of the file system and registry; and the generation module modifies the uninstall package if necessary to ensure that both records of the model computer's file system and registry are equivalent after the software application is removed.

12. A computer program product comprising:

a computer usable medium having computer readable code embodied therein for causing the removal of a software application resident on plurality of at least one computer terminals on a network, the computer program product including:

a computer readable program code device configured to cause a computer to effect the identification of steps required to remove the software application from a model computer;

a computer readable program code device configured to cause a computer to effect the generation of an automatically self-executing standalone uninstall package from the identified steps; and a computer readable program code device configured to cause a computer to effect the transmission of the uninstall package to the at least one computer terminal whereupon the uninstall package executes itself and removes the software application from the at least one computer terminal.

13. The computer program product of claim 12 wherein the uninstall package further comprises:
- a computer readable program code device configured to cause a computer to effect the removal of the software application from the model computer by using a corresponding uninstall program having a plurality of executable uninstall options, said uninstall program adapted to interface with a user in order to select which of the executable uninstall options are to be executed;
- a computer readable program code device configured to cause a computer to effect monitoring of the selection of the executable uninstall options; and
- a computer readable program code device configured to cause a computer to effect generation of the uninstall package from the selection of the executable uninstall options.

14. The computer program product of claim 12 wherein the uninstall package further comprises:
- a computer readable program code device configured to cause a computer to effect maintenance of a record of the software application's install-time activities on the model computer; and
- a computer readable program code device configured to cause a computer to effect generation of the uninstall package from the maintained record of the software application's install-time activities.

15. The computer program product of claim 12 comprising a computer readable program code device configured to cause a computer to effect the uninstall package to contain a minimum set of run-time components required to remove the software application from the at least one computer terminal.

* * * * *